(12) United States Patent
Indurkar

(10) Patent No.: US 11,102,646 B1
(45) Date of Patent: Aug. 24, 2021

(54) TRIGGERING ELECTRONIC SUBSCRIBER IDENTITY MODULE ACTIVATION

(71) Applicant: T-MOBILE INNOVATIONS LLC, Overland Park, KS (US)

(72) Inventor: Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/821,943

(22) Filed: Mar. 17, 2020

(51) Int. Cl.
*H04W 8/26* (2009.01)
*H04W 8/18* (2009.01)
*H04W 12/06* (2021.01)
*H04W 4/14* (2009.01)
*H04W 64/00* (2009.01)

(52) U.S. Cl.
CPC ............ *H04W 8/265* (2013.01); *H04W 4/14* (2013.01); *H04W 8/183* (2013.01); *H04W 12/06* (2013.01); *H04W 64/003* (2013.01)

(58) Field of Classification Search
CPC ....... H04W 12/06; H04W 8/04; H04W 8/183; H04W 4/70; H04W 4/50; H04W 12/72; H04W 8/06; H04W 60/00; H04W 8/18; H04W 4/60; H04W 12/08; H04W 12/45; H04W 8/02; H04W 8/12; H04W 4/14
See application file for complete search history.

(56) References Cited

U.S. PATENT DOCUMENTS

| | | | |
|---|---|---|---|
| 10,887,741 B1 | 1/2021 | Indurkar | |
| 2011/0246374 A1 | 10/2011 | Franz | |
| 2015/0334552 A1* | 11/2015 | Li | H04W 8/02 370/329 |
| 2016/0092145 A1 | 3/2016 | Manning et al. | |

(Continued)

OTHER PUBLICATIONS

Indurkar, Dhananjay, et al., "Embedded Subscriber Identity Module (eSIM) Profile Adaptation Based on Context," filed May 21, 2020, U.S. Appl. No. 16/880,723.

(Continued)

*Primary Examiner* — Kwasi Karikari

(57) ABSTRACT

A method of configuring an electronic subscriber identity module (eSIM) of a wireless communication device. The method comprises storing provisioning data packages in an eSIM of a wireless communication device, receiving a short message service (SMS) message by an eSIM management application executing on the mobile communication device from a provisioning application executing on a computer system, in response to the SMS message, determining by the eSIM management application a current location of the mobile communication device and the identities of the provisioning data packages, sending the current location and the identities of the provisioning data packages by the eSIM management application to the provisioning application, receiving a provisioning command message by the eSIM management application from the provisioning application, wherein the provisioning command message identifies one of the stored provisioning data packages, and activating the (Continued)

identified provisioning data package in the eSIM for communication by the wireless communication device.

20 Claims, 8 Drawing Sheets

(56) References Cited

U.S. PATENT DOCUMENTS

| | | | |
|---|---|---|---|
| 2016/0255567 A1* | 9/2016 | Petersson | H04W 12/06 455/432.1 |
| 2020/0120494 A1 | 4/2020 | Fares et al. | |
| 2020/0221294 A1 | 7/2020 | Kang et al. | |
| 2020/0228488 A1 | 7/2020 | Xu et al. | |
| 2020/0236529 A1 | 7/2020 | Anslot et al. | |
| 2020/0322884 A1 | 10/2020 | Di Girolamo et al. | |
| 2020/0351651 A1 | 11/2020 | Koo et al. | |
| 2020/0404501 A1 | 12/2020 | Kang et al. | |
| 2021/0029761 A1 | 1/2021 | Jung et al. | |
| 2021/0076195 A1 | 3/2021 | Chaugule et al. | |

OTHER PUBLICATIONS

Indurkar, Dhananjay, et al., "Bootstrap Electronic Subscriber Identity Module Configuration," filed Mar. 17, 2020, U.S. Appl. No. 16/821,937.

Indurkar, Dhananjay, et al., "Activation Communication Addresses of Internet of Things Devices", filed Mar. 17, 2020, U.S. Appl. No. 16/821,950.

Indurkar, Dhananjay, et al., "Internet of Things (IoT) Devices Wireless Communication Service Management Platform" filed May 28, 2020, U.S. Appl. No. 16/886,521.

Notice of Allowance dated Sep. 4, 2020, U.S. Appl. No. 16/821,950, filed Feb. 17, 2020.

Indurkar, Dhananjay, "Activation Communication Addresses of Internet of Things Devices", filed Nov. 24, 2020, U.S. Appl. No. 17/102,627.

FAIPP Pre-Interview Communication dated Mar. 26, 2021, U.S. Appl. No. 16/821,937, filed Mar. 17, 2020.

FAIPP Pre-Interview Communication dated Apr. 5, 2021, U.S. Appl. No. 16/886,521, filed May 28, 2020.

* cited by examiner

TRIGGERING ELECTRONIC SUBSCRIBER IDENTITY MODULE ACTIVATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may authenticate into a radio access network (RAN) operated by a cellular communication service provider by presenting confidential authentication credentials to a cell site, for example to a cell tower. In an initial state, a wireless device may not yet be provisioned with authentication credentials. In this case, the wireless device may be granted provisional access to the RAN subject to the constraint that it may only perform activation activities such as messaging with a provisioning system to obtain conventional authentication credentials. The authentication credentials may be stored in an electronic subscriber identity module (eSIM) chip that is integrated into the mobile communication device, for example electrically connected to the communication bus of the wireless communication device circuit card. This eSIM may be said to be non-removable, in the sense that a non-technical lay person could not ordinarily remove the eSIM without damaging the wireless communication device.

SUMMARY

In an embodiment, a method of configuring an electronic subscriber identity module (eSIM) of a wireless communication device is disclosed. The method comprises receiving an information request by a provisioning application executing on a computer system from a workstation for information about provisioning data packages stored in an eSIM of a wireless communication device, sending a brief message (e.g., a short message service (SMS) message, a multi-media message service (MMS) message, an Internet protocol (IP) notification message, or other short form message) by the provisioning application to the wireless communication device, whereby the wireless communication device is prompted to check-in with the provisioning application, and receiving a message by the provisioning application from the wireless communication device comprising a current location of the wireless communication device and a list of provisioning data packages stored in the eSIM of the wireless communication device. The method further comprises sending an information message comprising information about the current location of the wireless communication device and about the provisioning data packages stored in the eSIM of the wireless communication device by the provisioning application to the workstation, receiving a configuration request by the provisioning application from the workstation to configure the eSIM of the wireless communication device to activate one of the provisioning data packages stored in the eSIM of the wireless communication device, wherein the provisioning data package is identified in the request, and sending a provisioning command message by the provisioning application to the wireless communication device identifying a data package that the wireless communication device is commanded to make active in the eSIM of the wireless communication device.

In another embodiment, another method of configuring an electronic subscriber identity module (eSIM) of a wireless communication device is disclosed. The method comprises providing an eSIM configuration application programming interface (API) by a provisioning application executing on a computer system to a workstation, wherein the API provides controls for defining an itinerary of travel plans for a wireless communication device that identifies associations of locations and dates that the wireless communication device will be at the locations and provides controls for defining associations of provisioning data packages to at least some of the locations of the itinerary and receiving an eSIM provisioning command by the provisioning application via the API from the workstation that defines an itinerary of travel plans for a wireless communication device and that defines associations of provisioning data packages to some of the locations of the itinerary. The method further comprises, based on the eSIM provisioning command, creating a first eSIM configuration command by the provisioning application that identifies a first provisioning data package and a first future time at which the wireless communication device is commanded to activate the first provisioning data package for use by an eSIM of the wireless communication device in wireless communication and, based on the eSIM provisioning command, creating a second eSIM configuration command by the provisioning application that identifies a second provisioning data package and a second future time at which the wireless communication device is commanded to activate the second provisioning data package for use by the eSIM of the wireless communication device in wireless communication. The method further comprises sending the first eSIM configuration command and the second eSIM configuration command by the provisioning application to the wireless communication device, whereby the wireless communication device is configured to automatically activate the first provisioning data package when it is scheduled to be at a first location and to automatically activate the second provisioning data package when it is scheduled to be at a second location.

In yet another embodiment, yet another method of configuring an electronic subscriber identity module (eSIM) of a wireless communication device is disclosed. The method comprises storing a plurality of provisioning data packages in an eSIM of a wireless communication device and receiving a short message service (SMS) message by an eSIM management application executing on the mobile communication device from a provisioning application executing on a computer system. The method further comprises, in response to the SMS message, determining by the eSIM management application a current location of the mobile communication device and the identities of the provisioning data packages stored in the eSIM and sending the current location and the identities of the provisioning data packages stored in the eSIM by the eSIM management application to the provisioning application. The method further comprises receiving a provisioning command message by the eSIM management application from the provisioning application, wherein the provisioning command message identifies one of the stored provisioning data packages and activating the identified provisioning data package in the eSIM for communication actions of the wireless communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
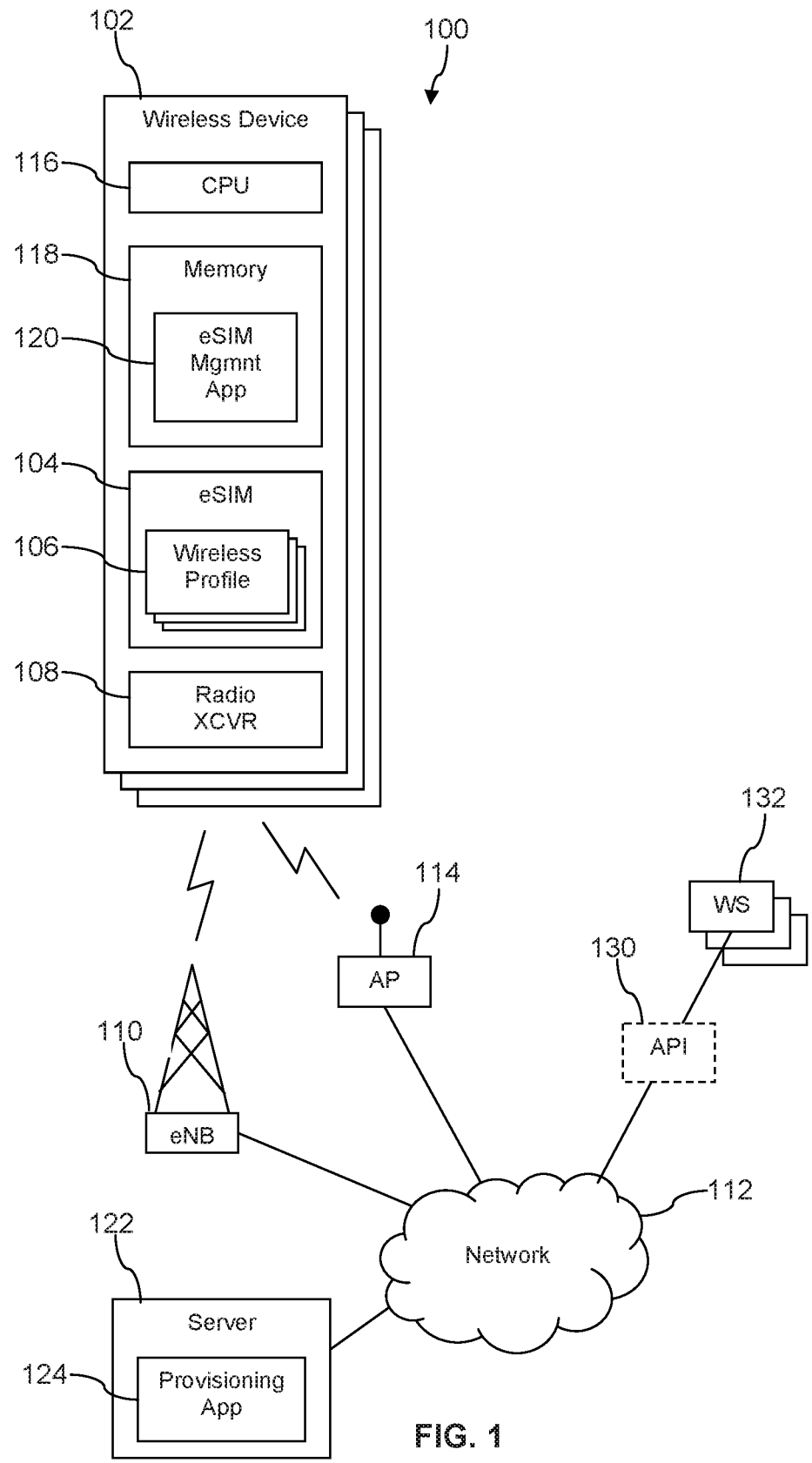
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method for dynamically activating previously loaded or stored electronic subscriber identity module (eSIM) provisioning data packages or profiles in a wireless communication device. The wireless communication device may have been initially provisioned with a bootstrap eSIM provisioning data package or profile that identified an eSIM provisioning server. When the wireless communication device initially powered on, it reached out, using the bootstrap eSIM profile for obtaining wireless communication access, to the eSIM provisioning server, received a plurality of eSIM provisioning data packages from the eSIM provisioning server, and stored these eSIM provisioning data packages in its eSIM. For further details about a wireless communication device initially provisioned with a bootstrap eSIM provisioning data package obtaining eSIM provisioning data packages from an eSIM provisioning server see U.S. patent application Ser. No. 16/821,937 filed Mar. 17, 2020 titled "Bootstrap Electronic Subscriber Identity Module Configuration," by Dhananjay Indurkar, which is hereby incorporated by reference herein in its entirety.

When the wireless communication device activates a selected one of the plurality of stored eSIM provisioning data packages, the eSIM makes the provisioning data of the selected eSIM provisioning data package the active provisioning data of the eSIM. When a radio transceiver or radio modem of the device requests wireless communication credentials and/or other communication provisioning information, the eSIM provides information accessed from the active provisioning data, for example pursuant to establishing a wireless communication link with a cell site or using a premium communication service. An eSIM provisioning data package may comprise one or more of a coverage map, RAN authentication credentials, communication service keys, application service keys, encryption keys, a phone number, a network identity, a country code. The eSIM provisioning data package may identify one or more radio frequency bands for use by the wireless communication device. The eSIM provisioning data package may comprise one or more of a wireless access authentication key, a billing parameter, a rating parameter, a charging parameter, a quality of service (QoS) parameter, a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key.

By activating different eSIM provisioning data packages, a wireless communication device can attach to different wireless communication networks as a native or home subscriber and not as a roaming device. Roaming devices may be subjected to excess communication service fees. Roaming devices may be provided restricted access to communication services. Native or home subscribers may be granted access to additional communication services not offered to roaming devices and/or may be granted higher quality of service (QoS) communication service. Additionally, because different wireless communication networks offer different kinds of communication services, by activating different eSIM provision data packages, a wireless communication device may avail itself of a desired communication service that is not provided by all wireless communication networks.

The present disclosure teaches a provisioning application executing on a computer system that provides an application programming interface (API) that presents an interface to control activation of eSIM provisioning data packages on wireless communication devices. For example, an enterprise may deploy a plurality of wireless communication devices attached to shipping containers and/or semi-truck trailers. An employee of the enterprise (e.g., a user) may use the API extended by the provisioning application, for example on a workstation in a private network operated by the enterprise, to track where the wireless communication devices are located and hence determine where the shipping containers and/or trailers to which the devices are attached are located. The user may use the API to command one or more of the wireless communication devices to activate a specified one of the plurality of eSIM provisioning data packages stored on the devices. In response, the provisioning application may send an activation command message to the wireless communication devices that causes the devices to activate the specified eSIM provisioning data package. In an embodiment, the provisioning application may first send a brief message (e.g., a short message service (SMS) message, a multi-media message service (MMS) message, an Internet protocol (IP) notification message, or other short form message) to the wireless communication devices prompting them to check in with the provisioning application. When the devices contact the provisioning application, then the provisioning application sends the command message to the devices.

While the text above describes a human user invoking commands of the API, alternatively an automated program executing on a computer system may invoke the commands of the API and to activate different eSIM provisioning data packages on wireless communication devices. The provisioning application may execute on the eSIM provisioning server that provides the plurality of eSIM provisioning data packages to the wireless communication devices or it may execute on a different computer system.

For example, the user may command all the wireless communication devices attached to the enterprise's shipping containers located on the same freight ship leaving New York harbor destined for Istanbul to activate a first eSIM provisioning data package that promotes communication via satellite communication. The command to activate the satellite communication eSIM provisioning data package may further provide rules or executable instructions to an eSIM management application that executes on the wireless communication devices to go into extended power saving mode whereby the devices wake up periodically (e.g., once per day) and exchange a message with the enterprise via the satellite communication link. As the freight ship approaches Istanbul, as may be known in consequence of tracking the location of the wireless communication devices based on the satellite communications enabled by the satellite communication eSIM provisioning data package, the user may use the API to command the wireless communication devices attached to the shipping containers on the freight ship to activate an eSIM provisioning data package that is suitable for use in Turkey.

Alternatively, under the same scenario as above, the user may use the API to command the wireless communication devices attached to the shipping containers, while the freight ship is in New York harbor, to activate to the first satellite communication eSIM provisioning data package at a first time associated with the scheduled departure of the freight ship from New York harbor. The user may further use the API to command the devices to activate the second Turkey communication eSIM provisioning data package at a second time associated with the scheduled arrival of the freight ship in Istanbul. These commands may be provided by the provisioning application to the eSIM management application executing on the wireless communication devices. These commands may further comprise rules or executable instructions that corroborate an expected location and make activation to the subject eSIM provisioning data package contingent on a location-based condition. For example, at the time the devices had been commanded to activate the satellite eSIM provisioning data package, if the location of the devices remains New York harbor, the devices do not activate the satellite eSIM provisioning data package. In this case, the eSIM management application may be configured to wait 12 hours and retry the activation based on corroboration of having left New York harbor.

Turning now to FIG. 1, a system 100 is described. In an embodiment, the system 100 comprises a wireless communication device 102 comprising an electronic subscriber identity module (eSIM) 104 that stores a plurality of eSIM provisioning data packages 106. The provisioning data packages 106 may be referred to as eSIM profiles or wireless profiles in some contexts. An eSIM provisioning data package 106 may comprise one or more of a coverage map, RAN authentication credentials, communication service keys, application service keys, encryption keys, a phone number, a network identity, a country code. An eSIM provisioning data package 106 may identify one or more radio frequency bands for use by the wireless communication device. An eSIM provisioning data package 106 may comprise one or more of a wireless access authentication key, a billing parameter, a rating parameter, a charging parameter, a quality of service (QoS) parameter, a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key.

The wireless communication device 102 further comprises at least one radio transceiver 108. In an embodiment, the wireless communication device 102 may comprise a global positioning system (GPS) receiver (not shown). The wireless communication device 102 may be an Internet of things (IoT) device. The wireless communication device 102 may be a mobile phone, a smart phone, a personal digital assistant (PDA), a wearable computer, a headset computer, a laptop computer, a tablet computer, or a notebook computer.

The system 100 further comprises a cell site 110 that is configured to provide a wireless communication link to the radio transceiver 108 according to at least one of a 5G, a long term evolution (LTE), a code division multiple access (CDMA), or a global system for mobile communications (GSM) telecommunication protocol. The cell site 110 is configured to communicatively couple the wireless communication device 102 to a network 112. The network 112 may comprise one or more public networks, one or more private networks, or a combination thereof. In an embodiment, the system further comprises a wireless access point (AP) 114 that provides a short range wireless communication link to the radio transceiver 108, for example according to a WiFi or a Bluetooth radio communication protocol. The AP 114 is configured to communicatively couple the wireless communication device 102 to the network 112. The wireless communication device 102 further comprises a processor 116 and a memory 118 storing an eSIM management application 120.

The system 100 further comprises a computer system 122 that executes a provisioning application 124. The provisioning application 124 makes an application programming interface (API) 130 available to qualified users, for example enterprise customers of a wireless communication service provider. The API 130 may be accessed by workstations 132 that present appropriate access credentials such as user identities and passwords. While the API 130 is illustrated as in a communication path between the network 112 and the workstations 132, it is understood that the API 130 may be part of the provisioning application 124 and comprises interfaces to methods and/or functions of the provisioning application 124 that may be invoked by the workstations 132.

A workstation 132 may invoke one or more methods of the API 130 to obtain information about one or more wireless communication devices 102, for example information identifying the locations of the devices 102, information about the hardware capabilities of the devices 102, a list of one or more eSIM provisioning data packages 106 stored in the eSIM 104 of the devices 102. In response, the provisioning application 124 communicates with the one or more of the wireless communication devices 102 to request the information. In an embodiment, the provisioning application 124 sends a brief message (e.g., a short message service (SMS) message, a multi-media message service (MMS)

message, an Internet protocol (IP) notification message, or other short form message) to the wireless communication device 102 to prompt the eSIM management application 120 to initiate communication with the provisioning application 124, for example to request command messages from the provisioning application 124. It is understood that the system 100 may comprise any number of wireless communication devices 102, cell sites 110, APs 114, and workstations 132.

The eSIM management application 120 may receive the request for information from the provisioning application 124, obtain location information from the device 102, obtain hardware capabilities information from the device 102, and obtain identities of stored eSIM provisioning data packages 106 from the eSIM 104. The location information may comprise GPS coordinates obtained from a GPS receiver installed in the device 102. The location information may comprise information from which a location of the device 102 may be inferred, for example identities of cell sites 110, service set identities (SSIDs) of access points 114, or other identities of radio sources detected by the device 102. The eSIM management application 120 may reply to the provisioning application 124 information request by sending the looked-up information in a message back to the provisioning application 124, for example via a wireless link to the cell site 110, from the cell site 110 to the network 112, and from the network 112 to the computer system 122 or via a wireless link to the AP 114, from the AP 114 to the network 112, and from the network 112 to the computer system 122. The provisioning application 124 may provide the requested information back to the workstation 132 via the API 130. The workstation 132 may present the information on a display screen for use by a human user. Alternatively, the workstation 132 may provide the information to an automation script or computer program executing on the workstation 132.

Based on the location of the wireless communication device 102 and based on the content of the eSIM provisioning data packages 106 stored in the eSIM 104, the workstation 132 may invoke a method of the API 130 to command the wireless communication device 102 to activate an eSIM provisioning data package 106 different from the currently active eSIM provisioning data package 106. In an embodiment, the provisioning application 124 may send an SMS message to the eSIM management application 120 to prompt the eSIM management application 120 to initiate communication with the provisioning application 124, for example to request command messages from the provisioning application 124. The provisioning application 124 sends a command message to the eSIM management application 120 commanding it to activate an eSIM provisioning data package 106 identified in the command message. The eSIM management application 120 causes the eSIM 104 to activate the identified eSIM provisioning data package 106 and returns a message to the provisioning application 124 confirming the activation of the different eSIM provisioning data package 106. The provisioning application 124 sends a reply via the API 130 to the workstation 132 indicating the successful activation of the specified eSIM provisioning data package.

In an embodiment, the workstation 132 may use the API 130 to define a schedule for the wireless communication device 102 to active to different eSIM provisioning data packages at different times. For example, the workstation 132 may define that the device 102 activate a first eSIM profile 106 at a first time based on a schedule for the device 102 to be at a first location at the first time, that the device 102 activate a second eSIM profile 106 at a second time based on a schedule for the device 102 to be at a second location at the second time, and that the device 102 activate a third eSIM profile 106 at a third time based on a schedule for the device 102 to be at a third location at the third time. The provisioning application 124 can send a command to the eSIM management application 120 to cause it to accomplish the time sequenced activation of the first profile 106, the second profile 106, and the third profile 106. The eSIM management application 120 may then monitor a current time and when the current time matches the scheduled time for activation, the eSIM management application 120 may then activate the appropriate profile 106 as scheduled. In an embodiment, the eSIM management application 120 may further be commanded by the provisioning application 124 to corroborate a present location of the device 102 agrees with an expected location of the device before it activates the activation to a different profile 106.

In an embodiment, the provisioning application 124 may provide the eSIM management application 120 with scripts or codes to execute to perform the commanded activations which the eSIM management application 120 may then execute. The scripts or codes may comprise corroborating an expected location of the device 102 with an actual current location of the device 102. If the expected and current locations match, the eSIM management application 120 activates the commanded eSIM provisioning data package. If the expected and current locations do not match, the eSIM management application 120 may defer the commanded activation until a later time when corroboration of current location with the expected location agrees sufficiently.

Figure 2:
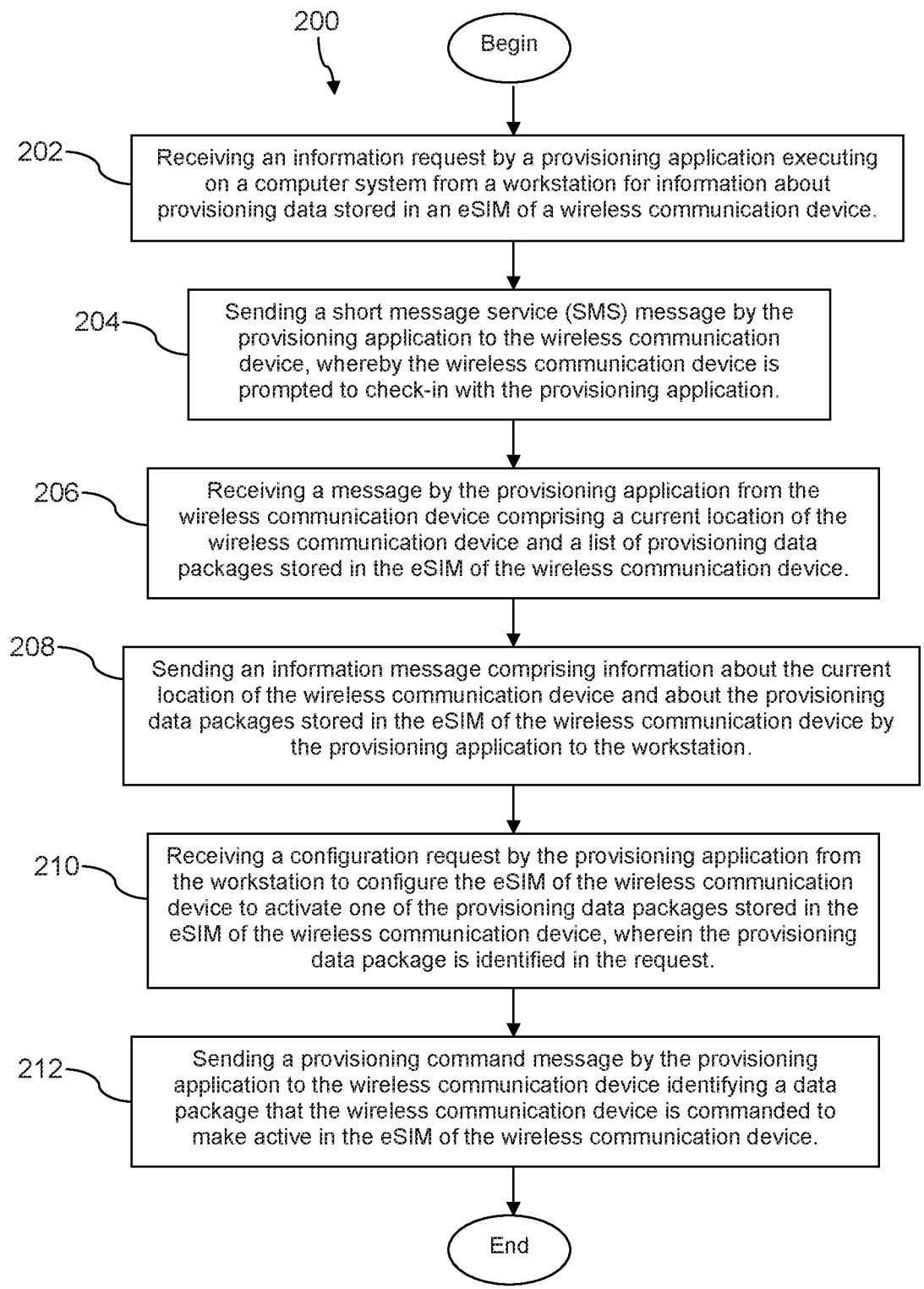
FIG. 2 is a flow chart of a method according to an embodiment of the disclosure.

Turning now to FIG. 2, a method 200 is described. In an embodiment, the method 200 is a method of configuring an electronic subscriber identity module (eSIM) of a wireless communication device. At block 202, the method 200 comprises receiving an information request by a provisioning application executing on a computer system from a workstation for information about provisioning data stored in an eSIM of a wireless communication device. The information request may identify the wireless communication device.

At block 204, the method 200 comprises sending a brief message (e.g., a short message service (SMS) message, a multi-media message service (MMS) message, an Internet protocol (IP) notification message, or other short form message) by the provisioning application to the wireless communication device, whereby the wireless communication device is prompted to check-in with the provisioning application. At block 206, the method 200 comprises receiving a message by the provisioning application from the wireless communication device comprising a current location of the wireless communication device and a list of provisioning data packages stored in the eSIM of the wireless communication device.

At block 208, the method 200 comprises sending an information message comprising information about the current location of the wireless communication device and about the provisioning data packages stored in the eSIM of the wireless communication device by the provisioning application to the workstation. At block 210, the method 200 comprises receiving a configuration request by the provisioning application from the workstation to configure the eSIM of the wireless communication device to activate one of the provisioning data packages stored in the eSIM of the wireless communication device, wherein the provisioning data package is identified in the request. At block 212, the method 200 comprises sending a provisioning command message by the provisioning application to the wireless communication device identifying a data package that the wireless communication device is commanded to make active in the eSIM of the wireless communication device.

In an embodiment, the information request received at block 202 may identify a plurality of wireless communication devices, and the provisioning application may perform the processing of blocks 204 and 206 with each of the identified devices separately. In this case, the processing of block 208 may involve the provisioning application bundling the information received from each of the plurality of identified devices in the information message and sending this to the workstation. The configuration request received at block 210 may identify the plurality of devices, and the processing of block 212 may involve the provisioning application sending a provisioning command message to each of the identified plurality of devices identifying the appropriate provisioning data package for the devices to activate.

Figure 3:
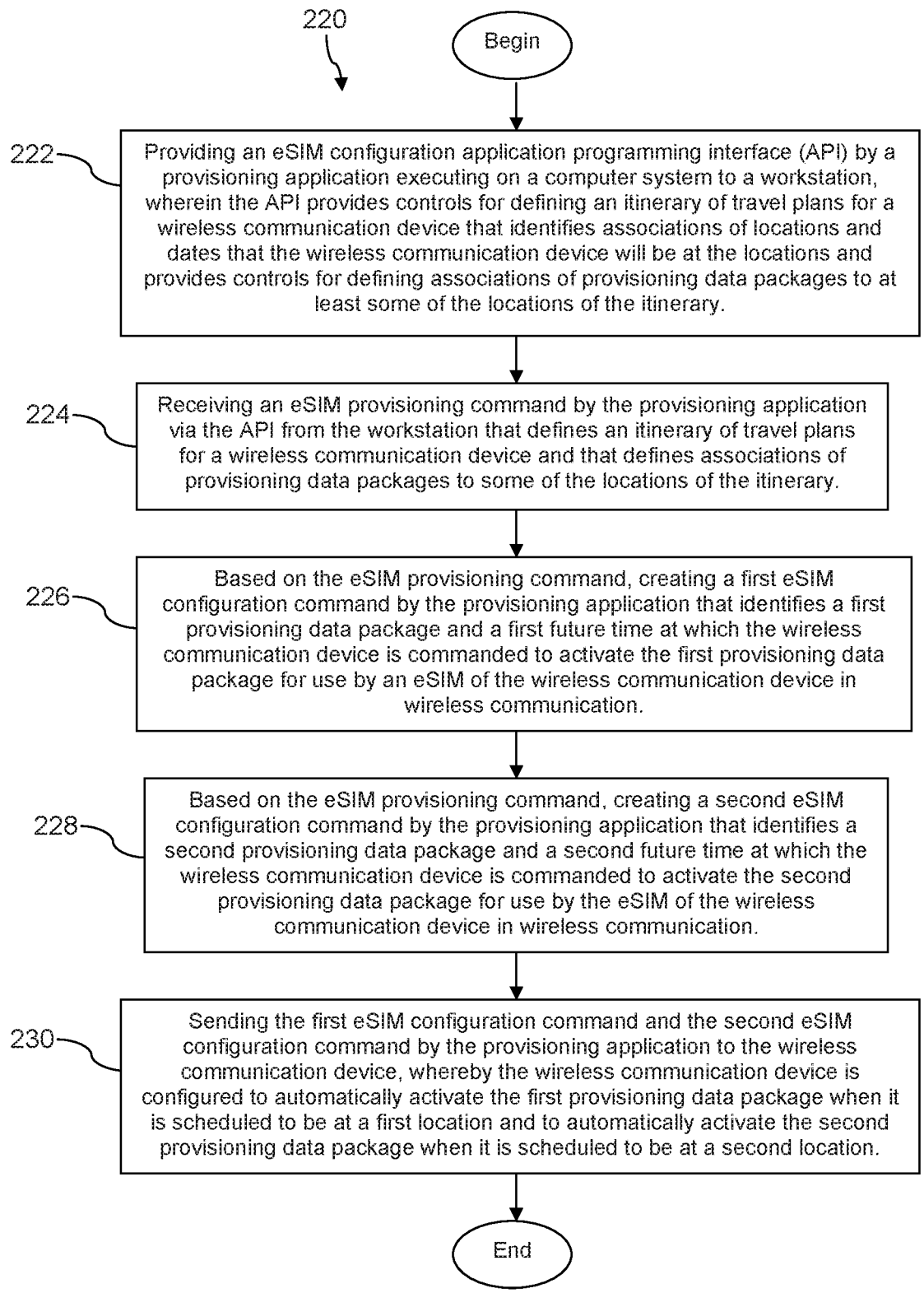
FIG. 3 is a flow chart of another method according to an embodiment of the disclosure.

Turning now to FIG. 3, a method 220 is described. In an embodiment, the method 220 is a method of configuring an electronic subscriber identity module (eSIM) of a wireless communication device. At block 222, the method 220 comprises providing an eSIM configuration application programming interface (API) by a provisioning application executing on a computer system to a workstation, wherein the API provides controls for defining an itinerary of travel plans for a wireless communication device that identifies associations of locations and dates that the wireless communication device will be at the locations and provides controls for defining associations of provisioning data packages to at least some of the locations of the itinerary.

At block 224, the method 220 comprises receiving an eSIM provisioning command by the provisioning application via the API from the workstation that defines an itinerary of travel plans for a wireless communication device and that defines associations of provisioning data packages to some of the locations of the itinerary. At block 226, the method 220 comprises based on the eSIM provisioning command, creating a first eSIM configuration command by the provisioning application that identifies a first provisioning data package and a first future time at which the wireless communication device is commanded to activate the first provisioning data package for use by an eSIM of the wireless communication device in wireless communication.

At block 228, the method 220 comprises, based on the eSIM provisioning command, creating a second eSIM configuration command by the provisioning application that identifies a second provisioning data package and a second future time at which the wireless communication device is commanded to activate the second provisioning data package for use by the eSIM of the wireless communication device in wireless communication. At block 230, the method 220 comprises sending the first eSIM configuration command and the second eSIM configuration command by the provisioning application to the wireless communication device, whereby the wireless communication device is configured to automatically activate the first provisioning data package when it is scheduled to be at a first location and to automatically activate the second provisioning data package when it is scheduled to be at a second location. In an embodiment, the first eSIM configuration command is sent in a first message to the wireless communication device by the provisioning application and the second eSIM configuration command is sent in a second message to the wireless communication device by the provisioning application. In another embodiment, the first eSIM configuration command and the second eSIM configuration command are sent together in a single message to the wireless communication device by the provisioning application.

In an embodiment, the method 220, like method 200 described further above, promotes the workstation identifying a plurality of wireless communication devices in the provisioning command at block 224 for being configured with different provisioning data packages at different times and/or locations based on the itinerary of travel plans, and promotes the provisioning application sending the first and second eSIM configuration command to each of the plurality of identified devices.

Figure 4:
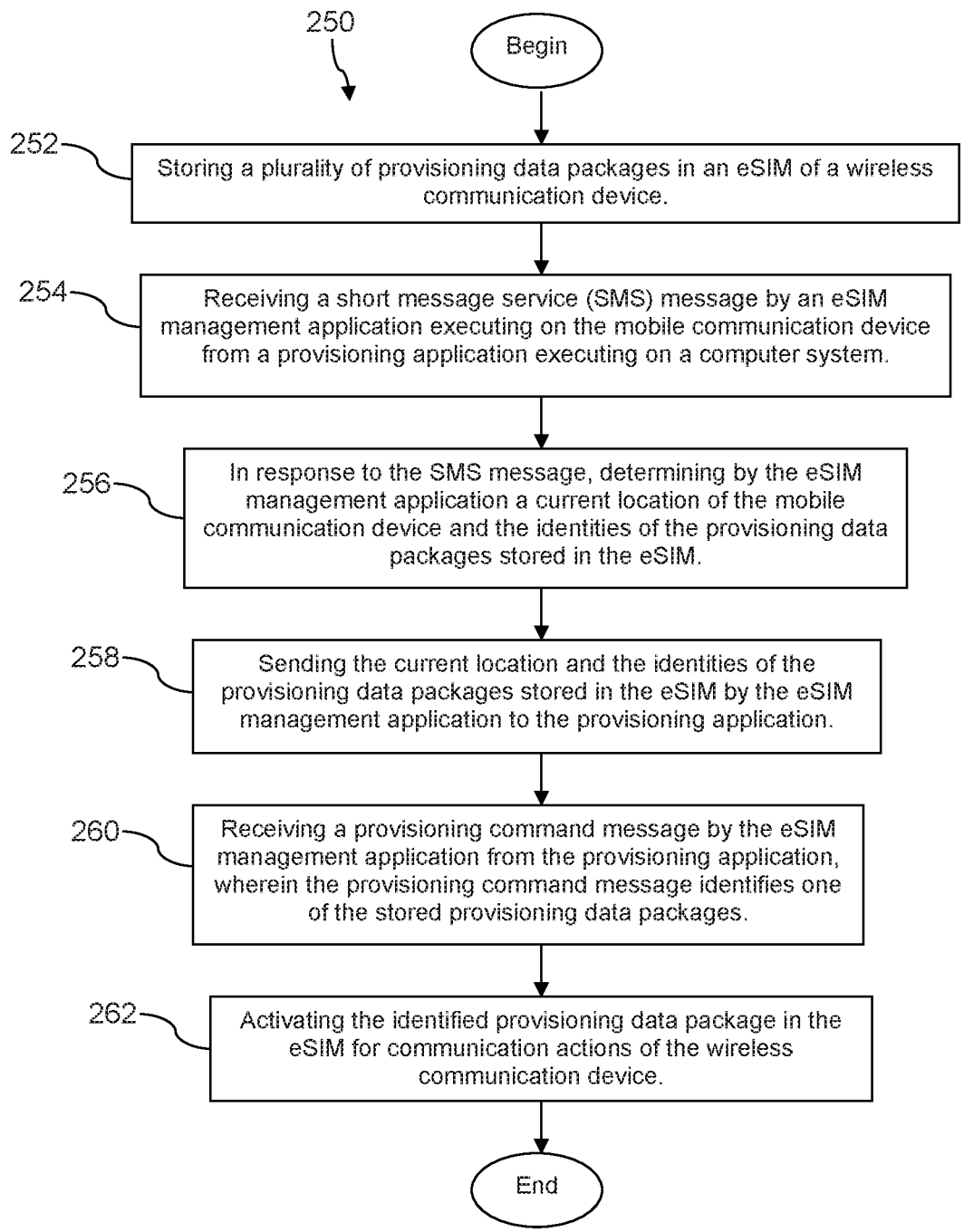
FIG. 4 is a flow chart of yet another method according to an embodiment of the disclosure.

Turning now to FIG. 4, a method 250 is described. In an embodiment, the method 250 is a method of configuring an electronic subscriber identity module (eSIM) of a wireless communication device. At block 252, the method 250 comprises storing a plurality of provisioning data packages in an eSIM of a wireless communication device.

At block 254, the method 250 comprises receiving a brief message (e.g., a short message service (SMS) message, a multi-media message service (MMS) message, an Internet protocol (IP) notification message, or other short form message) by an eSIM management application executing on the mobile communication device from a provisioning application executing on a computer system. At block 256, the method 250 comprises, in response to the SMS message, determining by the eSIM management application a current location of the mobile communication device and the identities of the provisioning data packages stored in the eSIM. In an embodiment, determining the current location of the wireless communication device comprises determining an identity of a cell site and the identity of the cell site serves as a proxy for the location of the wireless communication device. For example, the identity of the cell site may be used to look up a location of the cell site in a data store, and the location of the cell site may be substituted as the approximate location of the wireless communication device. In another embodiment, determining the current location of the wireless communication device comprises determining an identity of a wireless access point and the identity of the wireless access point serves as a proxy for the location of the wireless communication device. For example, the identity of the wireless access point may be used to look up a location of the wireless access point in a data store, and the location of the wireless access point may be substituted as the approximate location of the wireless communication device.

At block 258, the method 250 comprises sending the current location and the identities of the provisioning data packages stored in the eSIM by the eSIM management application to the provisioning application. At block 260, the method 250 comprises receiving a provisioning command message by the eSIM management application from the provisioning application, wherein the provisioning command message identifies one of the stored provisioning data packages. At block 262, the method 250 comprises activating the identified provisioning data package in the eSIM for communication actions of the wireless communication device.

Figure 5:
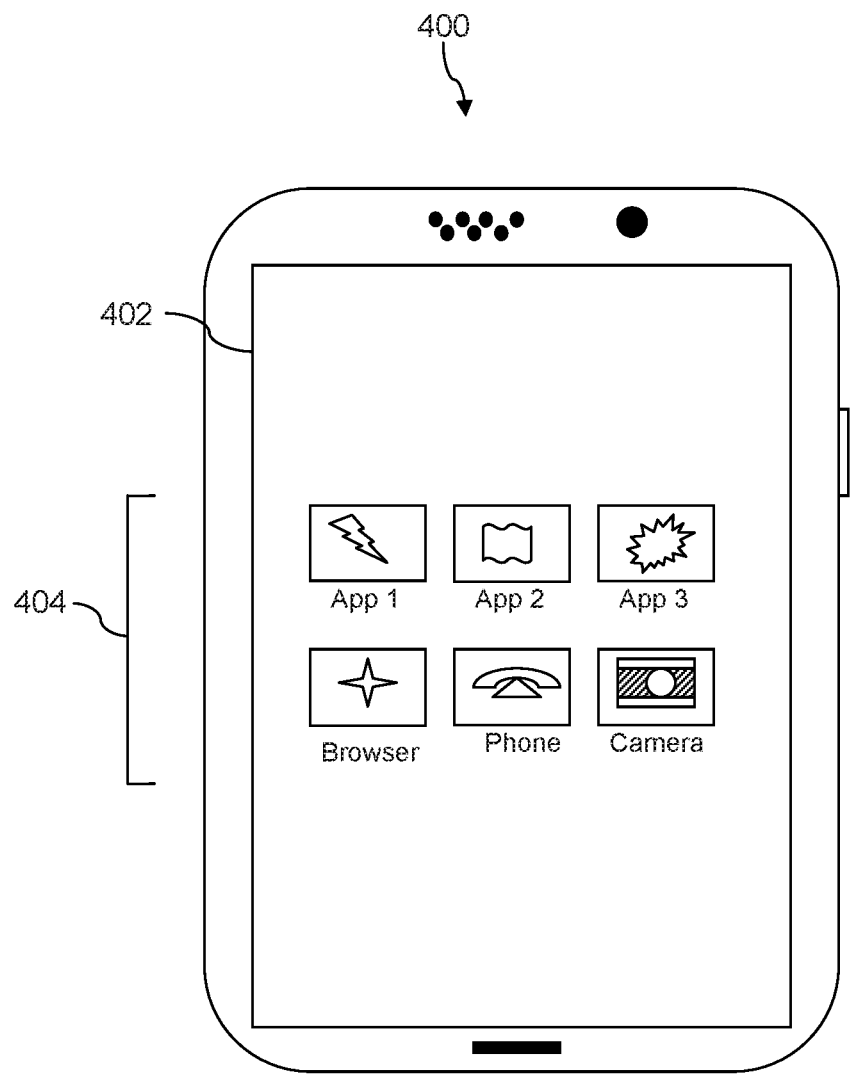
FIG. 5 is an illustration of a handset according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
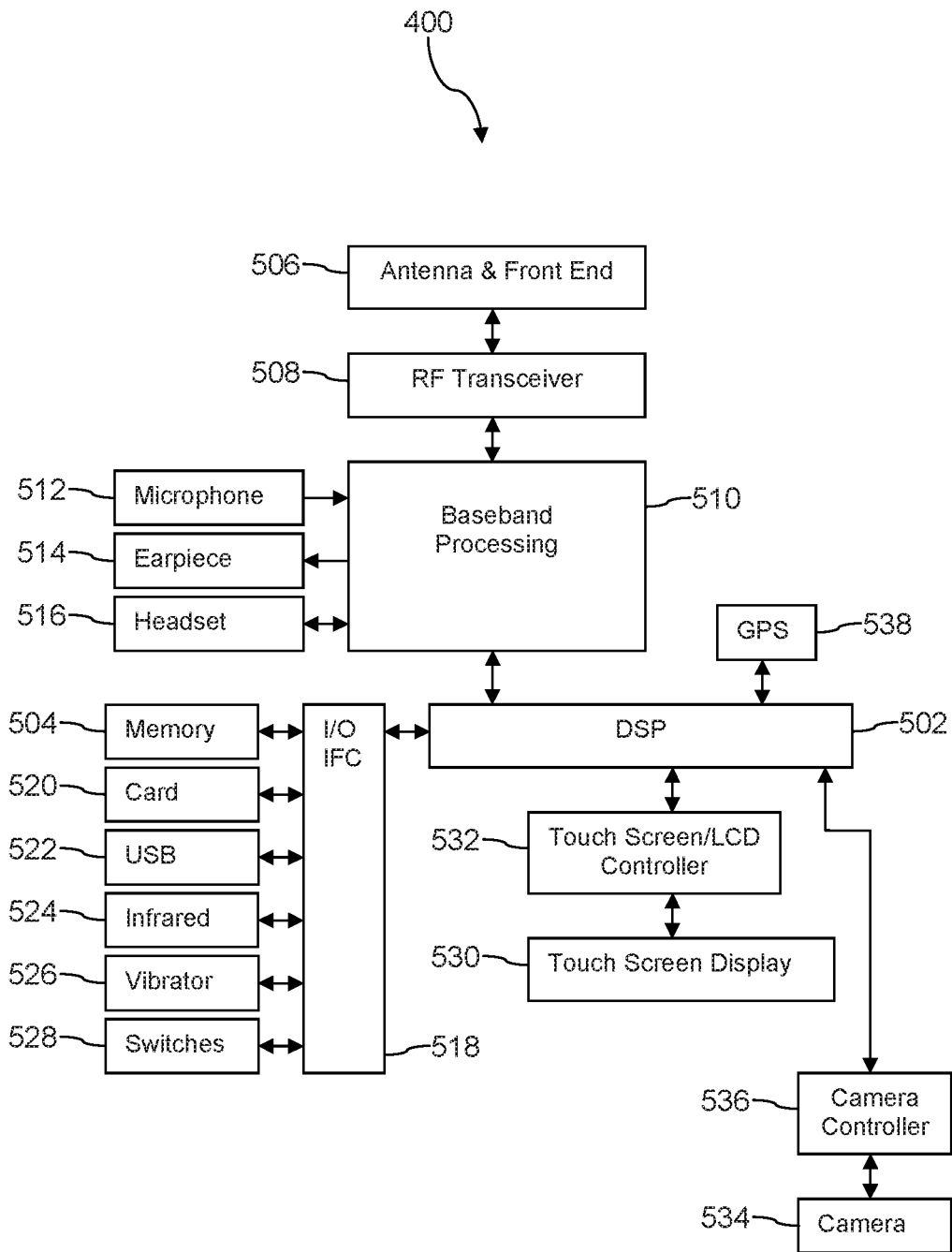
FIG. 6 is a block diagram of a hardware architecture according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
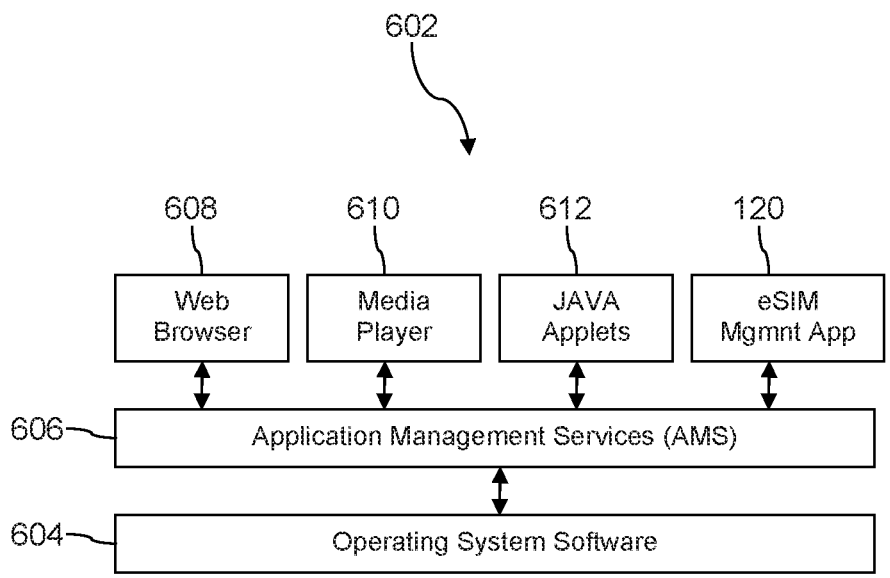
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The eSIM management application 120 is described further above with reference to FIG. 1. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
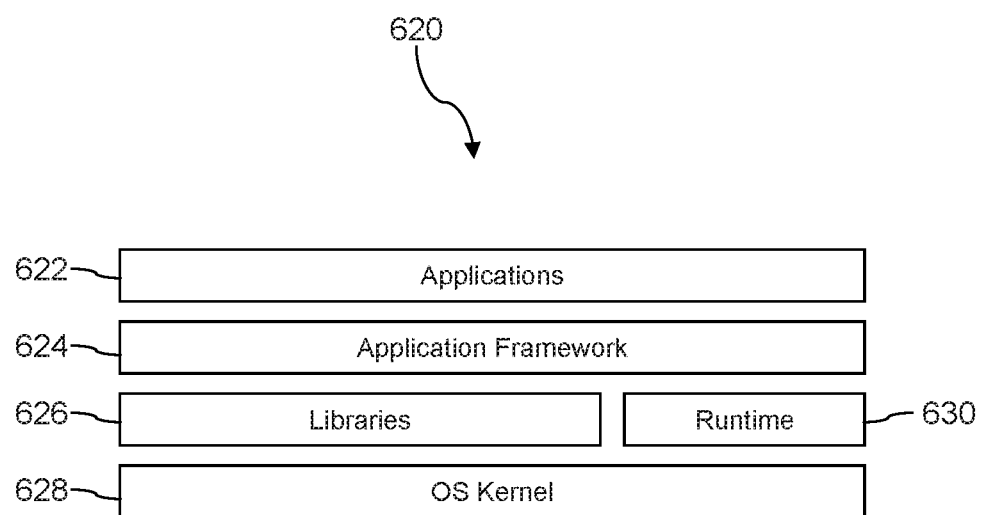
FIG. 7B is a block diagram of another software architecture according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
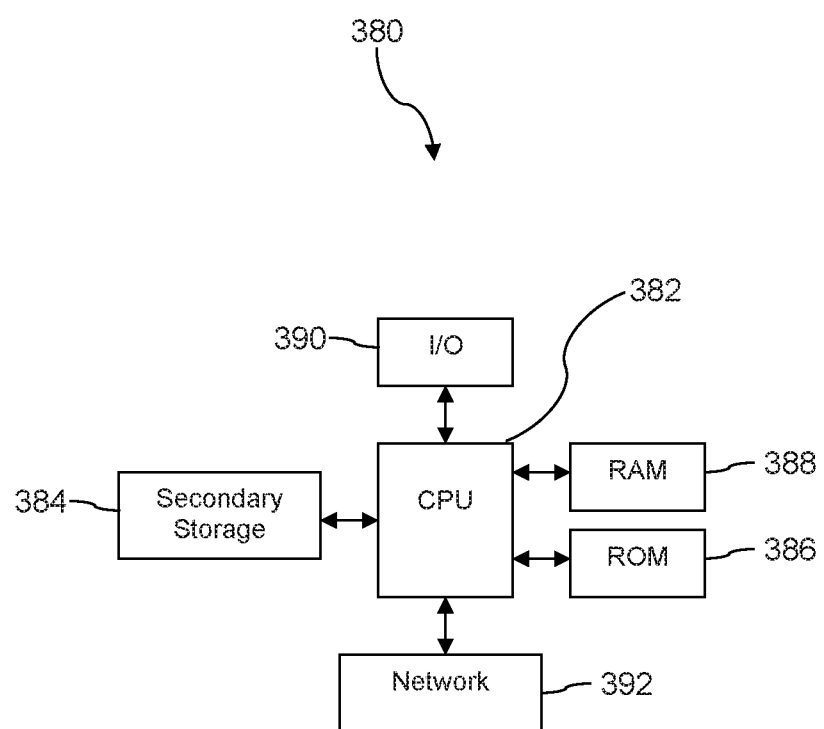
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of configuring an electronic subscriber identity module (eSIM) of a wireless communication device, comprising:
receiving an information request by a provisioning application executing on a computer system from a workstation for information about provisioning data packages stored in an eSIM of a wireless communication device;
sending a short message service (SMS) message by the provisioning application to the wireless communication device, whereby the wireless communication device is prompted to check-in with the provisioning application;

receiving a message by the provisioning application from the wireless communication device comprising a current location of the wireless communication device and a list of provisioning data packages stored in the eSIM of the wireless communication device;

sending an information message comprising information about the current location of the wireless communication device and about the provisioning data packages stored in the eSIM of the wireless communication device by the provisioning application to the workstation;

receiving a configuration request by the provisioning application from the workstation to configure the eSIM of the wireless communication device to activate one of the provisioning data packages stored in the eSIM of the wireless communication device, wherein the provisioning data package is identified in the request; and sending a provisioning command message by the provisioning application to the wireless communication device identifying the provisioning data package that the wireless communication device is commanded to make active in the eSIM of the wireless communication device.

2. The method of claim 1, wherein the wireless communication device is an Internet of things (IoT) device.

3. The method of claim 1, wherein the wireless communication device is a mobile phone, a smart phone, a personal digital assistant (PDA), a wearable computer, a headset computer, a laptop computer, a tablet computer, or a notebook computer.

4. The method of claim 1, wherein a provisioning data package comprises a coverage map, RAN authentication credentials, communication service keys, application service keys, encryption keys, a phone number, a network identity, or a country code.

5. The method of claim 1, wherein the information request comprises the identity of the wireless communication device.

6. The method of claim 1, wherein the information request comprises the identities of a plurality of wireless communication devices and the provisioning application sends the SMS to each of the identified wireless communication devices.

7. The method of claim 6, wherein the configuration request comprises the identities of the plurality of wireless communication devices and the provisioning application sends the provisioning command message to each of the identified wireless communication devices.

8. A method of configuring an electronic subscriber identity module (eSIM) of a wireless communication device, comprising:

providing an eSIM configuration application programming interface (API) by a provisioning application executing on a computer system to a workstation, wherein the API provides controls for defining an itinerary of travel plans for a wireless communication device that identifies associations of locations and dates that the wireless communication device will be at the locations and provides controls for defining associations of provisioning data packages to at least some of the locations of the itinerary;

receiving an eSIM provisioning command by the provisioning application via the API from the workstation that defines an itinerary of travel plans for the wireless communication device and that defines associations of provisioning data packages to some of the locations of the itinerary;

based on the eSIM provisioning command, creating a first eSIM configuration command by the provisioning application that identifies a first provisioning data package and a first future time at which the wireless communication device is commanded to activate the first provisioning data package for use by an eSIM of the wireless communication device in wireless communication;

based on the eSIM provisioning command, creating a second eSIM configuration command by the provisioning application that identifies a second provisioning data package and a second future time at which the wireless communication device is commanded to activate the second provisioning data package for use by the eSIM of the wireless communication device in wireless communication; and sending the first eSIM configuration command and the second eSIM configuration command by the provisioning application to the wireless communication device, whereby the wireless communication device is configured to automatically activate the first provisioning data package when it is scheduled to be at a first location and to automatically activate the second provisioning data package when it is scheduled to be at a second location.

9. The method of claim 8, wherein the first eSIM configuration command is sent in a first message to the wireless communication device by the provisioning application and the second eSIM configuration command is sent in a second message to the wireless communication device by the provisioning application.

10. The method of claim 8, wherein the first eSIM configuration command and the second eSIM configuration command are sent together in a single message to the wireless communication device by the provisioning application.

11. The method of claim 8, wherein at least one of the first provisioning data package or the second provisioning data package comprises the identity of at least one radio frequency band for use by the wireless communication device.

12. The method of claim 11, wherein at least one of the first provisioning data package or the second provisioning data package comprises a billing parameter, a rating parameter, a charging parameter, or a quality of service (QoS) parameter.

13. The method of claim 8, wherein at least one of the first provisioning data package or the second provisioning data package comprises a coverage map, RAN authentication credentials, communication service keys, application service keys, encryption keys, a phone number, a network identity, or a country code.

14. The method of claim 8, wherein the wireless communication device is an Internet of things (IoT) device.

15. A method of configuring an electronic subscriber identity module (eSIM) of a wireless communication device, comprising:

storing a plurality of provisioning data packages in an eSIM of a wireless communication device;

receiving a short message service (SMS) message by an eSIM management application executing on the mobile communication device from a provisioning application executing on a computer system;

in response to the SMS message, determining by the eSIM management application a current location of the mobile communication device and the identities of the provisioning data packages stored in the eSIM;

sending the current location and the identities of the provisioning data packages stored in the eSIM by the eSIM management application to the provisioning application;

receiving a first provisioning command message by the eSIM management application from the provisioning application that identifies a first provisioning data package and a first future time at which the wireless communication device is commanded to activate the first provisioning data package for use by the eSIM;

receiving a second provisioning command message by the eSIM management application from the provisioning application that identifies a second provisioning data package and a second future time at which the wireless communication device is commanded to activate the second provisioning data package for use by the eSIM;

activating the first provisioning data package in the eSIM for communication actions of the wireless communication device at the first future time when the wireless communication device is scheduled to be at a first location; and activating the second provisioning data package in the eSIM for communication actions of the wireless communication device at the second future time when the wireless communication device is scheduled to be at a second location.

16. The method of claim 15, wherein the wireless communication device is an Internet of things (IoT) device.

17. The method of claim 15, wherein the wireless communication device is a mobile phone, a smart phone, a personal digital assistant (PDA), a wearable computer, a headset computer, a laptop computer, a tablet computer, or a notebook computer.

18. The method of claim 15, wherein determining the current location of the wireless communication device comprises receiving global positioning system (GPS) from a GPS receiver of the wireless communication device.

19. The method of claim 15, wherein determining the current location of the wireless communication device comprises determining an identity of a cell site and the identity of the cell site serves as a proxy for the location of the wireless communication device.

20. The method of claim 15, wherein determining the current location of the wireless communication device comprises determining an identity of a wireless access point and the identity of the wireless access point serves as a proxy for the location of the wireless communication device.

* * * * *